Figure 1:
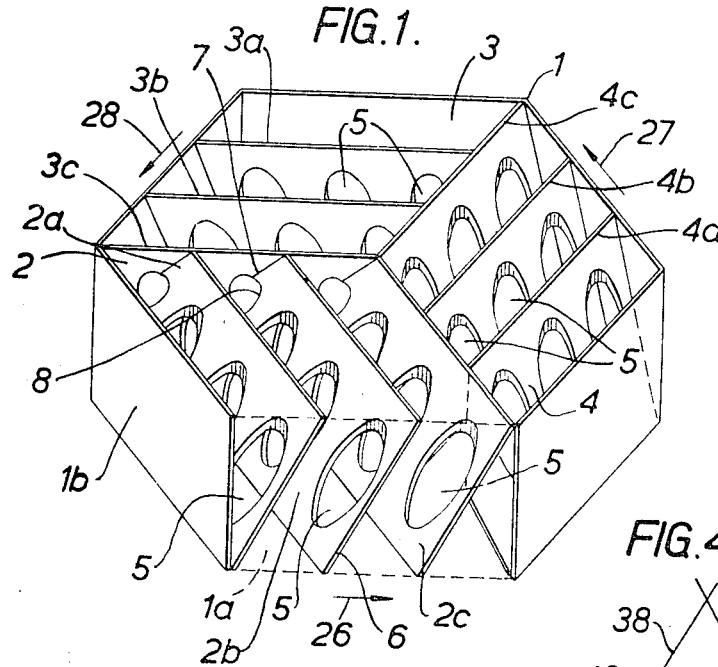

Oct. 25, 1966       J. WEBB ETAL       3,281,327
NUCLEAR FUEL ASSEMBLIES
Filed Feb. 11, 1965                2 Sheets-Sheet 2
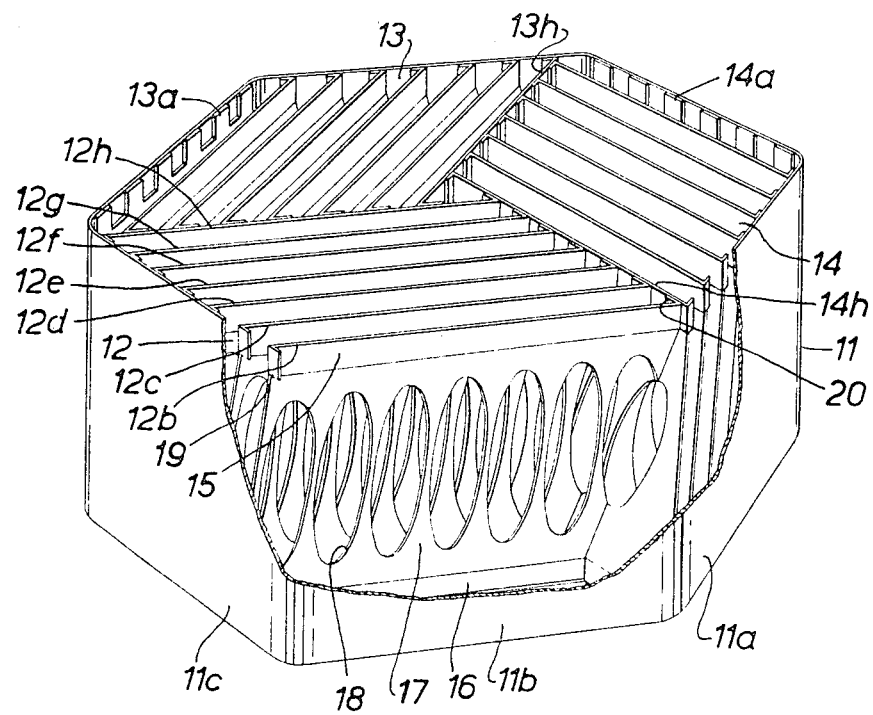
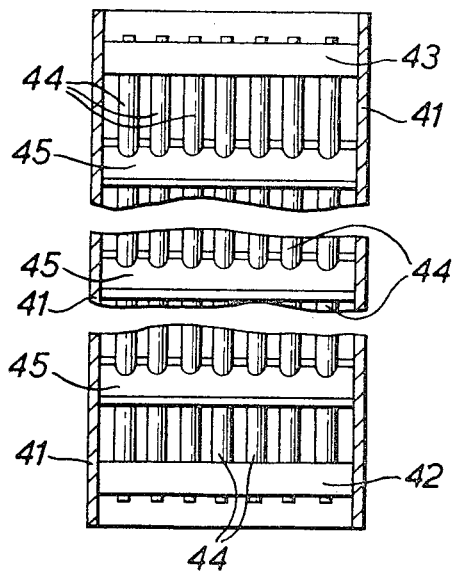
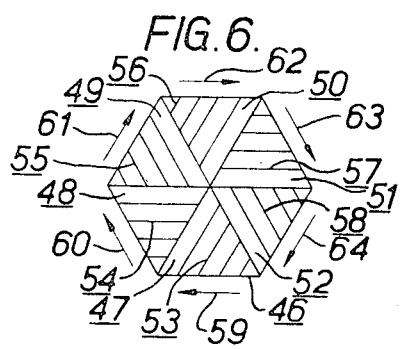

United States Patent Office 3,281,327
Patented Oct. 25, 1966

3,281,327
NUCLEAR FUEL ASSEMBLIES
John Webb, Bryn, near Wigan, and Bernard Ward, Haydock, St. Helens, England, assignors to United Kingdom Atomic Energy Authority, London, England
Filed Feb. 11, 1965, Ser. No. 431,961
Claims priority, application Great Britain, Feb. 13, 1964, 6,179/64
8 Claims. (Cl. 176—76)

This invention relates to nuclear fuel assemblies such as comprise a plurality of elongate fuel elements arranged with their longitudinal axes parallel. In such an assembly the individual fuel elements are spaced, intermediate their ends, one from another by spacer grids. Previously proposed spacer grids have been of cellular form, penetrated by the fuel elements and designed to restrain radial deflection and bowing of the fuel elements.

According to one aspect of the present invention a spacer grid for a nuclear fuel assembly having a plurality of elongate fuel elements arranged with their longitudinal axes parallel comprises, inter alia, a parallel array of spacer diaphragms adapted to be penetrated by the fuel elements and tilted with respect to the longitudinal axes of the fuel element.

The invention also includes within its scope a nuclear fuel assembly having inter alia, a plurality of elongate fuel elements arranged with their longitudinal axes parallel, and intermediate the ends of the assembly a parallel array of spacer diaphragms penetrated by the fuel elements and tilted with respect to the longitudinal axes of the fuel elements.

With such an arrangement the spacer diaphragms serve not only to space the fuel elements one from another but also to promote swirling of coolant flowing between the fuel elements from one end of the assembly to the other. In this respect the spacer diaphragms act as deflector vanes imparting to the main flowstream a component of flow transversely of the fuel elements. Whereas coolant flow from one end to another in a nuclear fuel assembly having conventional cellular spacer grids tends to be in channels between and defined by the fuel elements, the swirling of coolant promoted by the spacer grid of the invention is considered to be advantageous from the point of view of heat transfer considerations since it helps reduce hot channel factors arising from geometrical tolerances and local fuel element variations and also helps reduce coolant outlet temperature gradients arising from heat flux gradients across the assembly.

Preferably each spacer diaphragm has a series of apertures, each aperture serving for passage of an individual fuel element, and the spacer diaphragms overlie one another to the extend that a fuel element passing through an aperture in one diaphragm makes contact with an end portion of at least one adjacent diaphragm.

Preferably the diaphragms are supported within a sleeve and the space within the sleeve is divided into a number of sectors each having an array of parallel diaphragms, the orientation of the diaphragms in the sectors preferably being such that a rotational component of flow is imparted to the main coolant flowstream.

Figure 4:
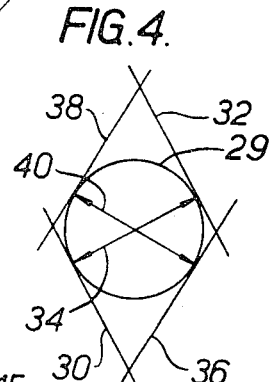
Figure 3:
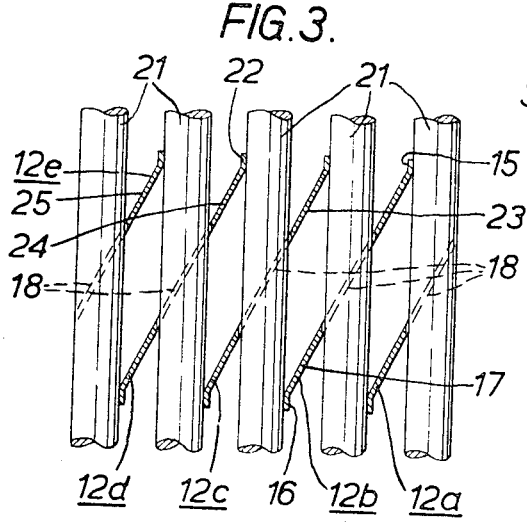

In the accompanying exemplifying drawings, FIGURE 1 is a diagrammatic perspective view of one form of spacer grid in accordance with the invention, FIGURE 2 is a perspective view of an alternative form of spacer grid in accordance with the invention, FIGURE 3 is a fragmentary sectional view of part of FIGURE 2 showing fuel elements penetrating the grid, FIGURE 4 is a fragmentary plan view showing in diagrammatic form a fuel element penetrating two spacer grids in accordance with the invention, FIGURE 5 is a part-sectional elevation of a nuclear fuel assembly in accordance with the invention, and FIGURE 6 is a diagrammatic plan view of yet another form of spacer grid in accordance with the invention.

FIGURE 1 shows a spacer grid comprising a support member in the form of an outer metal sleeve 1 of regular hexagonal cross-section. The space within the sleeve is divided into three similar rhomboidal sectors 2, 3, 4. The sector 2 houses an array of three parallel spacer diaphragms 2a, 2b, 2c, the sector 3 an array of three parallel spacer diaphragms 3a, 3b, 3c, and the sector 4 an array of three parallel spacer diaphragms 4a, 4b, 4c.

The diaphragms are in the form of thin partition members made of flat sheet metal strips, and one side wall 1a of the sleeve 1 has been indicated in dotted outline only in order to show more clearly the three diaphragms 2a, 2b, 2c. As can be seen these three diaphragms are tilted or inclined with respect to side wall 1b of the sleeve 1 and extend from the bottom to the top of the sleeve 1. In other words, whilst the lower and upper end-edges of the diaphragms 2a, 2b, 2c are parallel to the lower and upper end-edges of the side wall 1b, these three diaphragms 2a, 2b, 2c slope away from the side wall 1b in extending from the bottom to the top of the sleeve 1.

Each of the diaphragms 2a to 4c has three symmetrically disposed holes 5 which are elliptical or oval in full face view with their major axes lying in lines parallel to the side-edges of the diaphragms and their minor axes lying in lines parallel to the end-edges of the diaphragms. The three diaphragms 2a, 2b, 2c, overlie one another so that in plan view, the upper end-edge of diaphragm 2b, for example, lies between the upper and lower end-edges of the diaphragm 2c and is effectively disposed as a tangent to the three holes 5 in the diaphragm 2c, and are supported from the sleeve 1. Thus for example side-edge 6 of diaphragm 2b extends in contact with and has top and bottom tabs (not shown) secured to the inner surface of sleeve wall 1a. Similarly side-edge 7 of diaphragm 2b extends in contact with and has top and bottom tabs (not shown) secured to diaphragm 3c, the side edge 7 being cut away at 8 so as to leave the central hole 5 in diaphragm 3c unobstructed.

The inclination and spacing of the diaphragm has been exaggerated in FIGURE 1 in order to show more clearly the construction of the spacer grid. The orientation of the diaphragms 3a to 3c can be considered to be equivalent to that obtained by rotating the grid sector 2 through 120° (clockwise in plan view)—and similarly the sector 4 can be considered to be equivalent to the sector 2 rotated through 240°.

FIGURE 2 shows a spacer grid comprising an outer metal sleeve 11 of regular hexagonal cross-section. Inside the sleeve the space is divided into three similar rhomboidal sectors 12, 13, 14. The sector 12 has an array of eight parallel spacer diaphragms (seven of which are shown and designated 12b–12h), the sector 13 an array of eight parallel spacer diaphragms 13a–13h and the sector 14 an array of eight parallel spacer diaphragms 14a–14h. Side walls 11a, 11b and 11c of the sleeve 11 have been shown partly cut away to expose the diaphragms (diaphragm 12a has been omitted for clarity) which are all of sheet metal and similar strip form. Thus the diaphragm 12b for example has top and bottom end portions 15 and 16 parallel to side wall 11b and a major central or intermediate flat portion 17 tilted or inclined with respect to the side wall 11b. In other words the portion 17 slopes towards the side wall 11b in extending from portion 16 to portion 15. The diaphragms extend from top to bottom of the sleeve 11 and each have seven symmetrically disposed holes 18 which are elliptical or oval in full face view with their major axes lying in lines at right-angles, and their minor axes lying in lines parallel, to the upper and lower end-edges of the intermediate portions of the diaphragms. The diaphragms 12a–12h overlie one another so that in plan view, the top end portion of the diaphragm 12c for example lies between the top and bottom end portions of the diaphragm 12b and is disposed so as to effectively be seen as a tangent to the holes 18 in the diaphragm 12b, and are supported from the sleeve. Thus for example portion 15 of diaphragm 12b has a tab 19 in contact with and secured to the inner surface of side walls 11c. Similarly portion 15 of diaphragm 12b has a tab 20 in contact with and secured to diaphragm 14h, the corresponding side-edge of portion 17 being shaped as shown to avoid obstruction of the holes 18. The top portions of diaphragms 13a, 14a (and similarly of diaphragm 12a) are spaced slightly from the corresponding side walls of the sleeve and are of castellated form. The three diaphragms 12h, 13h and 14h are shaped to define a hole (similar to the holes 18) at the centre of the sleeve 11 so that the spacer grid is adapted to be penetrated by a total of one hundred and sixty-nine fuel elements.

The inclination of the diaphragm 13a–13h can be considered to be equivalent to that of the diaphragms 12a-12h as obtained by rotating the grid sector 12 through 120° and similarly the sector 14 can be likened to the sector 12 rotated through 240° (rotation being clockwise in plan view).

FIGURE 3 is a fragmentary sectional view in a plane perpendicular to the diaphragms 12a–12h and shows fuel elements 21 of circular cross-section penetrating the spacer grid. The fuel elements 21 are typically in the form of pins or rods made of uranium oxide in stainless steel sheaths and form part of a nuclear fuel assembly having a plurality of elongate fuel elements arranged with their longitudinal axes parallel. Each hole 18 as seen in plan view is of circular cross-section, and serves as an aperture for passage for one of the elements 21, the effective diameter of the aperture being slightly larger than that of the element 21 so that the element has a small clearance in the aperture. As the spacer diaphragms overlie one another, a fuel element passing through an aperture in one diaphragm makes contact with at least one adjacent diaphragm. Thus the fuel element 21 passing through the hole 18 in the diaphragm 12c makes contact at an upper position with upper end portion 22 of the adjacent diaphragm 12d and contact at a lower position with the portion 16 of the adjacent diaphragm 12b. The fuel rod 21 passing through the hole 18 in the diaphragm 12a makes contact at an upper position with upper portion 15 of the diaphragm 12b and contact at a lower position with a protuberance or stud (not shown) on the inner surface of the side wall 11b (FIGURE 2). Thus fuel elements passing through the holes 18 in the peripheral diaphragms 12a, 13a and 14a make contact with an adjacent diaphragm and at an axially spaced position with the adjacent side wall of the sleeve, whilst fuel elements penetrating the holes 18 in the other diaphragms make contact at two axially spaced positions with the two adjacent diaphragms, one to either side of the penetrated diaphragm.

Since the major portion 17 of the diaphragm 12b and similarly major portions of the other diaphragms (such as portions 23, 24, 25 of the diaphragms 12c, 12d and 12e respectively) are tilted with respect to the longitudinal axes of the fuel elements or rods 21, coolant flowing upwardly over the fuel elements or pins 21 from one end of the nuclear fuel assembly to the other has imparted to it a component of flow transversely of the fuel elements, and this is considered advantageous for the reasons given above. Thus the spacer diaphragms serve to space apart the fuel elements and also as deflector vanes promoting coolant swirling. The clearance between the apertures and fuel elements prvides for coolant flow over the portions of the elements passing through the holes 18.

Referring back to FIGURE 1 it is clear that coolant flowing upwardly through the sectors 2, 3, 4 of the sleeve 1 has imparted to the main coolant flowstream a rotational component of flow as indicated by arrows 26, 27, 28. Similar remarks apply to the spacer grid of FIGURE 2. It is to be understood that the spacer grid of FIGURE 1 is adapted for penetration by fuel elements of a nuclear fuel assembly in the general manner indicated in FIGURE 3. Since the diaphragms of FIGURE 1 are of flat form, point contact will occur between fuel elements and diaphragms adjacent to the penetrated diaphragms, as compared with the line contact afforded by the FIGURE 2 diaphragm upper and lower end portions.

For a FIGURE 2 spacer grid with a triangular fuel element lattice of 0.29″ pitch, the inclination of the diaphragms (the included angle between a plane containing the portion 17 and a plane parallel to the plane of the side wall 11b, for example) is typically 15° over one inch depth of the sleeve, the pressure drop across such a grid being comparable with that of a conventional cellular spacer grid. The clearance between the fuel rods and apertures is typically at least 0.01″ (diametral) for a rod diameter of 0.23″.

In a typical assembly a number of similar spacer grids are used, such grids being spaced apart along the length of the nuclear fuel assembly. The orientation of the diaphragms may be related between the grids in such a manner as to promote coolant swirling over the length of the assembly. Thus for example with upward coolant flow and FIGURE 2 spaced grids at four inch intervals over the length of the fuel assembly, one spaced grid is conveniently orientated as though rotated through 60° (anticlockwise in plan view) as compared with the grid immediately below. Thus as seen in enlarged plan view in FIGURE 4 a fuel element 29 makes contact with two parallel diaphragms 30, 32 in one grid at opposite ends of a given diameter 34 and in the next grid with two parallel diaphragms 36, 38 at opposite ends of a diameter 40 angularly rotated with respect to the given diameter 34. The grids are typically made of stainless steel and are conveniently supported from an external support structure also supporting top and bottom support grids for the nuclear fuel assembly. Thus FIGURE 5 shows on a reduced scale an external support structure in the form of an open-ended casing or wrapper 41 of hexagonal cross-section in which are located and supported as for example by welding or rivetting a bottom fuel element support grid 42 and a top fuel element support grid 43. Fuel elements in the form of rods or pins 44 (similar to the fuel elements 21 and 29) are supported and located at their ends by the grids 42, 43 and form a nuclear fuel assembly comprising a plurality of elongate fuel elements arranged with their longitudinal axes parallel. Spaced apart along the length of the assembly and lying between the grids 42, 43 are spacer grids 45, typically of the form described above with reference of FIGURE 2 which are located and supported from and within the casing 41 as for example by welding or rivetting and which are penetrated by the fuel pins 44, in a manner such as described above with reference to FIGURES 3 and 4. Thus a pin contacting a diaphragm at a given position in one grid may contact a diaphragm in another grid at a position angularly displaced with respect to the given position.

It is to be understood that the invention is not limited to the form of spacer grids described above by way of example. Thus the grids may have sleeves of other than hexagonal cross-section, and the space within a hexagonal sleeve may be divided up into other than rhomboidal sectors, for example six triangular sectors. Such a grid is shown diagrammatically in FIGURE 6, and comprises an outer metal sleeve 46 of regular hexagonal cross-section. The space inside the sleeve 46 is divided into six similar triangular sectors 47 to 52, each of the triangular sectors 47 to 52 having a set of five parallel diaphragms 53 to 58 respectively. The orientation of the tilted diaphragms in the sectors is such as to deflect coolant flowing upwardly through the grid to promote swirling as indicated by the arrows 59 to 64 in a manner as described above with reference to FIGURES 1 and 2. In the spacer grid of FIGURE 6 the diaphragm end-edges in any one sector are not parallel to the sleeve side wall of that sector, and this is considered advantageous in that it assists coolant flow through the grid. Alternatively a spacer grid may comprise a single set of parallel diaphragms, since such an arrangement serves to promote coolant swirling by imparting a transverse flow component in the manner described above.

We claim:

1. A spacer grid for a nuclear reactor fuel assembly having a plurality of elongate fuel elements arranged with their longitudinal axes parallel, the grid comprising a support member housing an array of parallel spacer diaphragms adapted to be penetrated by the fuel elements and tilted with respect to a wall of the support member, each diaphragm having a series of symmetrically disposed apertures, each aperture serving for passage of one of said fuel elements, and the diaphragms overlying one another to an extent such that an end portion of one diaphragm is disposed tangentially to the apertures of an adjacent diaphragm and said end portion contacts one of said fuel elements when positioned to pass through one of said apertures of said adjacent diaphragm.

2. A spacer grid as claimed in claim 1, wherein the diaphragms are supported within a sleeve and the space within the sleeve is divided into a number of sectors each having an array of parallel diaphragms.

3. A spaced grid as claimed in claim 2, wherein the diaphragms in one of the sectors are angularly orientated with respect to the diaphragms in the other sectors so as to impart a rotational component of flow to a coolant flowstream to be passed through the grid.

4. A spacer grid as claimed in claim 3, wherein the sleeve is of regular hexagonal cross-section and the space within the sleeve is divided into three rhomboidal sections.

5. A spacer grid as claimed in claim 3, wherein the sleeve is of regular hexagonal cross-section and the space within the sleeve is divided into six triangular sectors.

6. A nuclear reactor fuel assembly having a plurality of elongate fuel elements arranged with their longitudinal axes parallel, a spacer grid intermediate the ends of the fuel elements, the grid comprising a support member housing an array of parallel spacer diaphragms tilted with respect to a wall of the support member and penetrated by the fuel elements, each diaphragm having a series of symmetrically disposed apertures, each aperture serving for passage of one of said fuel elements, and the diaphragms overlying one another to an extent such that any one of the fuel elements penetrates only one of the diaphragms of the grid and contacts an end portion of at least one adjacent diaphragm of the grid.

7. A nuclear reactor fuel assembly as claimed in claim 7, further comprising a second spacer grid axially spaced from the first spacer grid, and wherein the fuel elements penetrate the diaphragms of the two axially spaced spacer grids, the diaphragms in one grid being angularly orientated with respect to those of the other such that a fuel element contacting at a first position the end portion of a diaphragm in one grid contacts the end portion of a diaphragm in the other grid at a second position angularly displaced about the fuel element relative to the first position.

8. A nuclear reactor fuel assembly having a casing, bottom and top fuel element support grids supported in the casing, a plurality of elongate fuel elements supported and located at their ends by the bottom and top support grids, at least two spacer grids spaced apart in the casing longitudinally of the fuel elements and between the bottom and top support grids, each spaced grid comprising a sleeve supported from the casing and housing an array of parallel spacer diaphragms tilted with respect to the sleeve and penetrated by the fuel elements, in each grid the diaphragms overlying one another to an extent such that a fuel element penetrates only one diaphragm of that grid and contacts an end portion of at least one adjacent diaphragm of that grid, and the diaphragms of one spacer grid being angularly orientated relative to the diaphragms of the other spacer grid whereby a fuel element contacting at a first position the end portion of one of the diaphragms in one spaced grid contacts the end portion of one of the diaphragms in the other spaced grid at a position angularly displaced about the fuel element relative to the first position.

References Cited by the Examiner

UNITED STATES PATENTS 3,137,637  6/1964  Elliott _____ 176—78

BENJAMIN R. PADGETT, *Primary Examiner.*

L. DEWAYNE RUTLEDGE, *Examiner.*

M. J. SCOLNICK, *Assistant Examiner.*